(12) United States Patent
Federowicz

(10) Patent No.: US 7,997,944 B1
(45) Date of Patent: Aug. 16, 2011

(54) BONDING DEVICE

(75) Inventor: Michael Federowicz, East Providence, RI (US)

(73) Assignee: MAL Management Group, LLC, Smithfield, RI (US)

( * ) Notice: Subject to any disclaimer, the term of this patent is extended or adjusted under 35 U.S.C. 154(b) by 0 days.

(21) Appl. No.: 12/753,925

(22) Filed: Apr. 5, 2010

(51) Int. Cl.
*H01R 4/36* (2006.01)
(52) U.S. Cl. ........................................... 439/814
(58) Field of Classification Search .................. 439/814, 439/100, 798, 724, 108
See application file for complete search history.

(56) References Cited

U.S. PATENT DOCUMENTS

| | | | |
|---|---|---|---|
| 1,943,660 A * | 1/1934 | Edwards | 439/798 |
| 7,537,467 B1 * | 5/2009 | Gretz | 439/108 |
| 7,591,656 B1 | 9/2009 | Gretz | |

* cited by examiner

*Primary Examiner* — Alexander Gilman
(74) *Attorney, Agent, or Firm* — Salter & Michaelson

(57) ABSTRACT

A bonding device for providing an electrical ground to a plurality of remote devices from a main junction box with a main ground cable. The bonding device includes an elongated electrically conductive housing having a through passage for receiving therethrough the main ground cable. The electrically conductive housing further includes a plurality of passage holes that each extend substantially transverse to the elongated through passage, and with each of the passage holes for receiving a ground wire associated with one of the remote devices. Fasteners retain the ground wire in each corresponding passage hole.

20 Claims, 11 Drawing Sheets

BONDING DEVICE

FIELD OF THE INVENTION

The present invention relates in general to an electrical bonding device. More particularly, the present invention relates to an inline bonding device for providing an electrical ground to a plurality of remote devices from a main junction box that includes a main ground cable.

BACKGROUND OF THE INVENTION

All residential, as well as commercial, electrical power systems include some type of a main junction box with an earth ground line. Also, for certain remote devices such as for a satellite dish, there is a grounding requirement. At the present time when installations are made, the grounding is usually jury rigged such as by punching a hole in the main junction box and connecting a wire into the ground line. This approach is unsafe and does not provide an effective ground for the remote device. If more than one remote device is to be connected, which is quite possible, then further wires are run to the junction box in a jury rigged manner.

Accordingly, it is an object of the present invention to provide an effective bonding device and one which in particular is an inline bonding device that enables the main ground conductor to be coupled therethrough while at the same time providing several taps from the main line.

Another object of the present invention is to provide an improved bonding device for providing an electrical ground to a plurality of remote devices from a main junction box that includes a main ground cable.

Still another object of the present invention is to provide a bonding device as stated and that can be constructed simply, is inexpensive to manufacture and install, and is safe in operation.

SUMMARY OF THE INVENTION

In accordance with the present invention there is provided a bonding device for providing an electrical ground to a plurality of remote devices from a main junction box with a main ground cable. The bonding device comprises an elongated electrically conductive housing having a through passage for receiving therethrough the main ground cable. The electrically conductive housing further includes a plurality of passage holes that each extend substantially transverse to the elongated through passage with each of the passage holes for receiving a ground wire associated with one of the remote devices. Fasteners retain the ground wire in each corresponding passage hole.

In accordance with other aspects of the present invention the electrically conductive housing is constructed of a metal material; the passage through the electrically conductive housing has a larger diameter than the diameter of each passage hole; the passage holes are preferably through holes; each ground wire preferably extends a predetermined distance beyond the terminal end of each passage hole; including a channel in a sidewall of the electrically conductive housing for receiving an end of each ground wire; the electrically conductive housing also preferably has a plurality of threaded holes that extend transverse to the respective ground wire passage holes and receive the respective fasteners; each fastener is a threaded screw with the end thereof tightened against a corresponding ground wire; the threaded holes are in communication with the respective passage holes, and the passage holes are non-communicative with the main housing through passage; including a set screw through the electrically conductive housing urged against the main ground cable to hold the ground cable in place; the electrically conductive housing includes a top threaded male end that is adapted for securing to a hole in the main junction box by means of a threaded ring, and a bottom threaded female end for receiving an insulator sheath.

In accordance with another embodiment of the present invention there is provided a bonding device for providing an electrical ground to a plurality of remote devices from a main junction box. The bonding device comprises an electrically conductive housing having a center passage for receiving therein a ground cable; the electrically conductive housing being of elongated shape; the electrically conductive housing further including a plurality of passage holes that each extend substantially transverse to the center passage with each of the passage holes for receiving a ground wire associated with one of the remote devices; and fasteners for retaining the ground wire in each corresponding passage hole.

In accordance with other aspects of this embodiment the electrically conductive housing is constructed of a metal material; the passage in the electrically conductive housing has a larger diameter than the diameter of each passage hole; the passage holes are preferably through holes; each ground wire preferably extends a predetermined distance beyond the terminal end of each passage hole; including a channel in a sidewall of the electrically conductive housing for receiving an end of each ground wire; the electrically conductive housing also has a plurality of threaded holes that extend transverse to the respective ground wire passage holes and receive the respective fasteners; each fastener is a threaded screw with the end thereof tightened against a corresponding ground wire; wherein the threaded holes are in communication with the respective passage holes, and the passage holes are non-communicative with the main housing passage; and including a set screw through the electrically conductive housing urged against the main ground cable to hold the ground cable in place; and the center passage is preferably a blind passage.

DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION

Reference is now made to the drawings and in particular to FIGS. 1-8 that illustrate the basic construction of the inline bonding device. FIGS. 9-13 further illustrate the inline bonding device as associated with a junction box.

Figure 5:
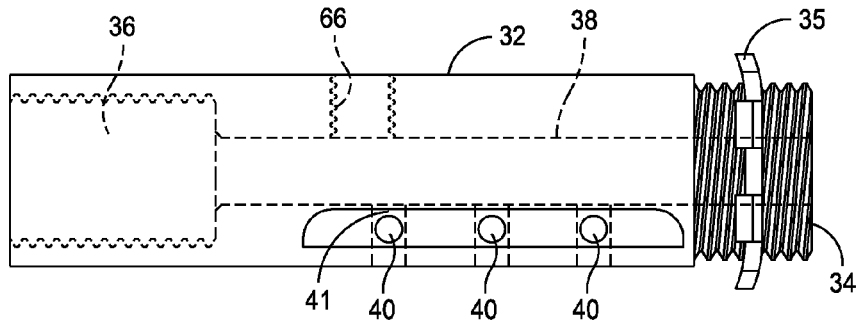
FIG. 5 is a further side elevation view of the housing.
Figure 6:
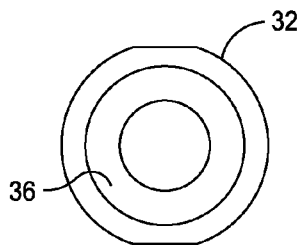
FIG. 6 is a left side view.
Figure 7:
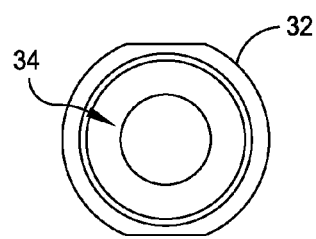
FIG. 7 is a right side view.
Figure 9:
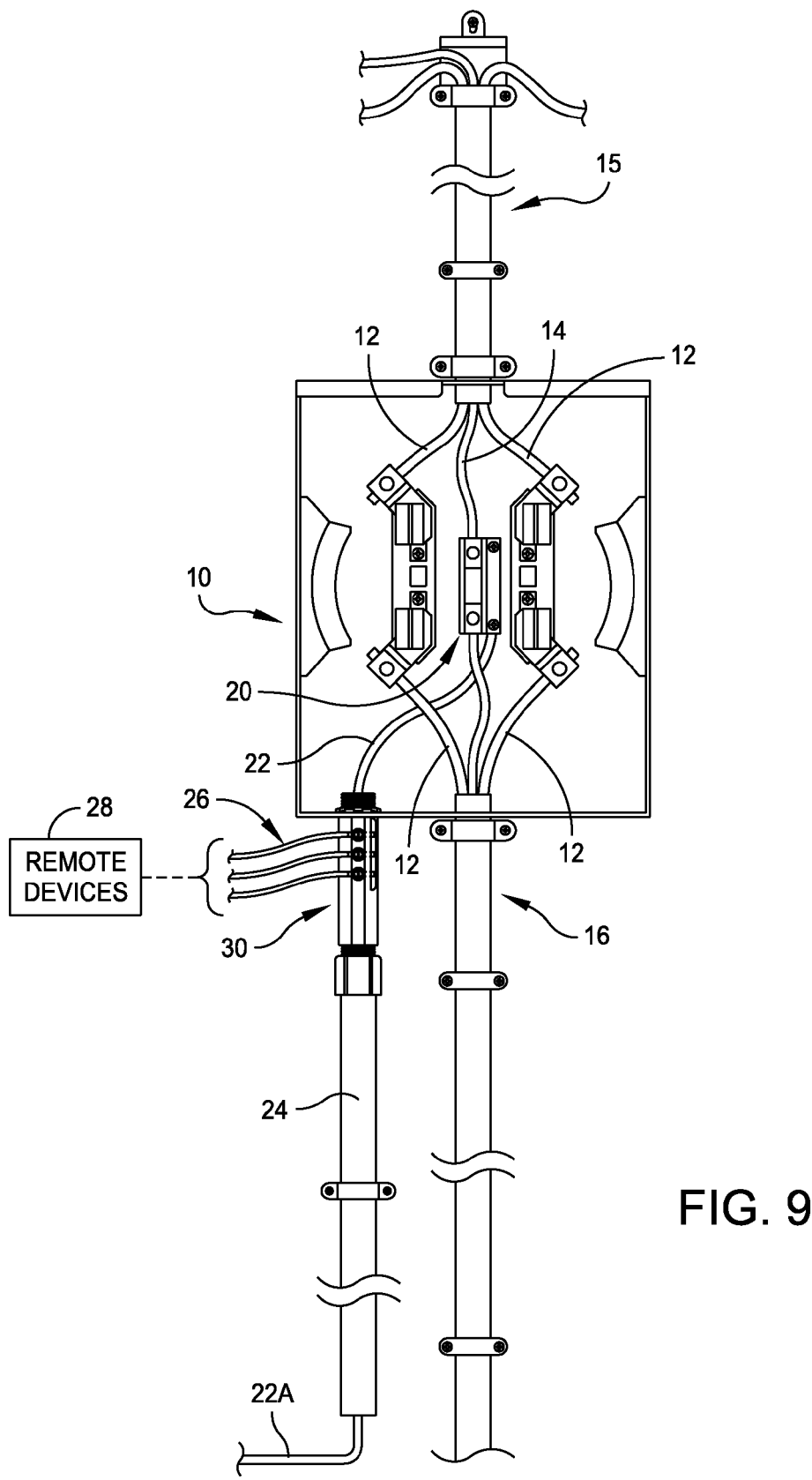
FIG. 9 is an illustration of the inline bonding device as used with an electrical power system.
Figure 10:
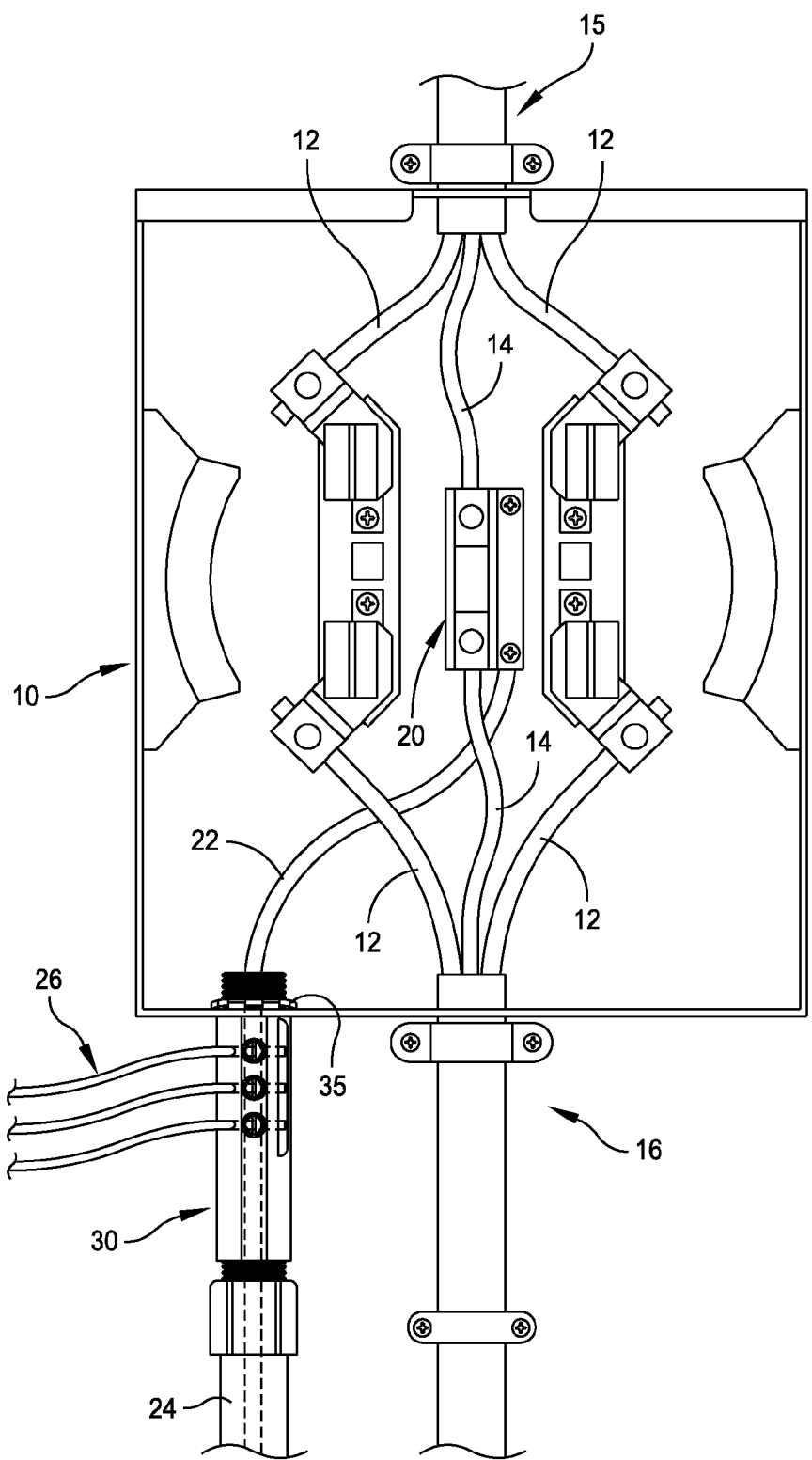
FIG. 10 is a view similar to FIG. 9 but somewhat enlarged.

Before discussing the details of the inline bonding device, reference may be made to FIGS. 9 and 10 for an illustration of the input side of an electrical power system. This may be, for example, a 100 amp or 200 amp service that is typically provided for residential use. In FIG. 5 there is illustrated the conventional metal junction box 10 that has coupled therethrough power leads 12 and ground lead or wire 14. FIGS. 9 and 10 illustrate an input side at 15 and an output side at 16 relative to the junction box 12. The input side may be coupled from power lines and the output side at 16 would couple to the service provided within the residence. At least the power lines 12 couple through circuit breakers or the like. Because the junction box and its general construction is well known, the description does not go into great detail regarding the construction of the junction box and the electrical components therein.

In the junction box 10 there is provided a ground block 20 as illustrated in FIG. 10. There is a ground lead 14 leading into the ground block 20 and a ground lead also leading out of the ground block to the output at 16. Also coupling from the ground block 20 is the ground wire 22. Now, as illustrated in FIG. 9, the inline bonding device 30 is illustrated as essentially in line between the junction box 10 and the plastic insulator sleeve 24. The ground wire 22 extends through the inline bonding device 30 through the insulator tube 24 and is illustrated in FIG. 9 as extending at the output side at 22A. In a typical installation this ground wire is secured to a ground rod that is driven into the ground in accordance with certain electrical codes. FIG. 9 also illustrates wiring 26 coupled from the inline bonding device 30. The wiring 26 connects to respective remote devices illustrated in FIG. 9 by the remote device box 28. These remote devices may be, for example, a satellite dish, phone service and cable tv.

Figure 11:
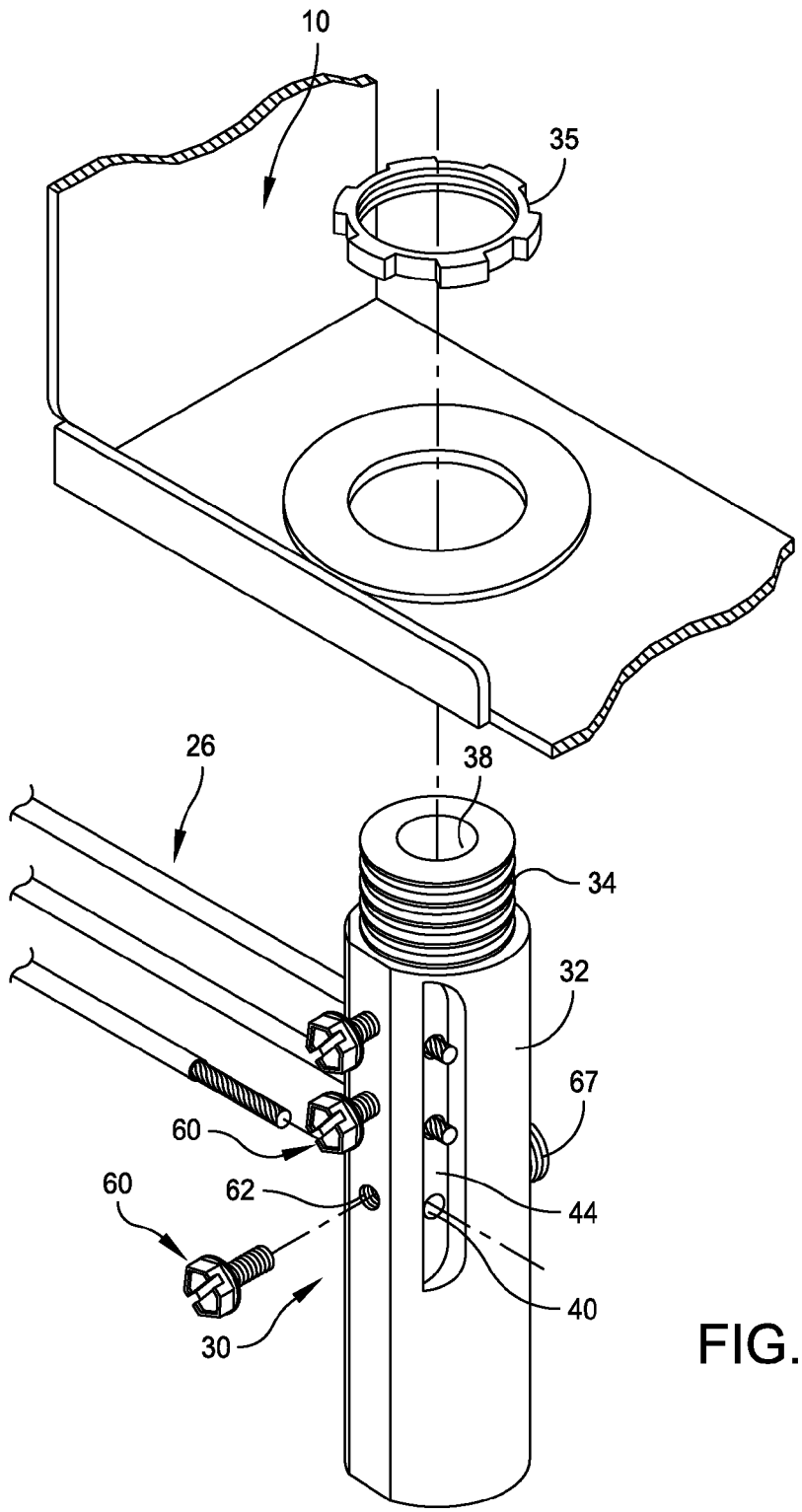
FIG. 11 is an exploded perspective view illustrating the inline bonding device as associated with a junction box.
Figure 12:
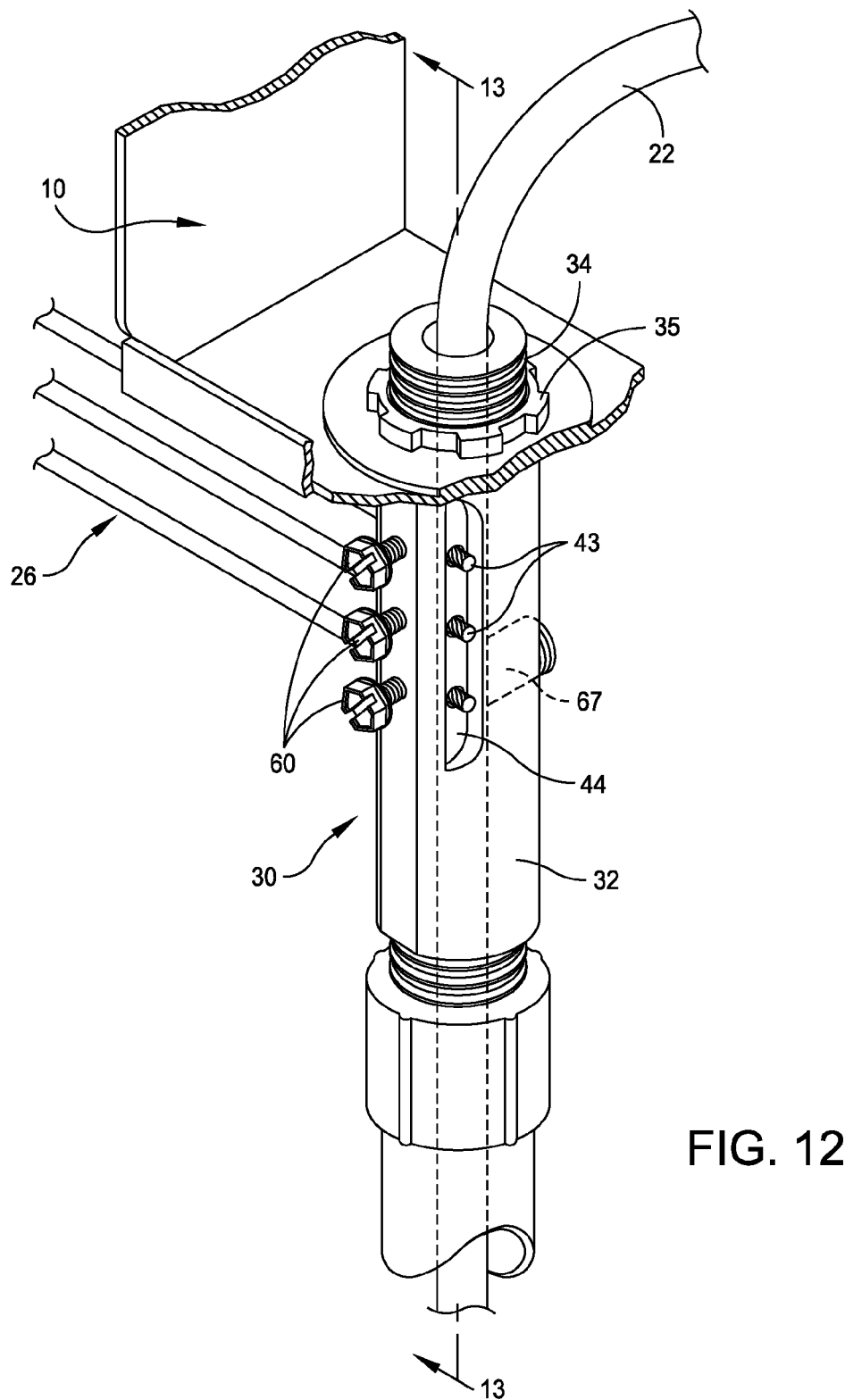
FIG. 12 is a perspective view like that shown in FIG. 11 but with the inline bonding device in position relative to the junction box.
Figure 13:
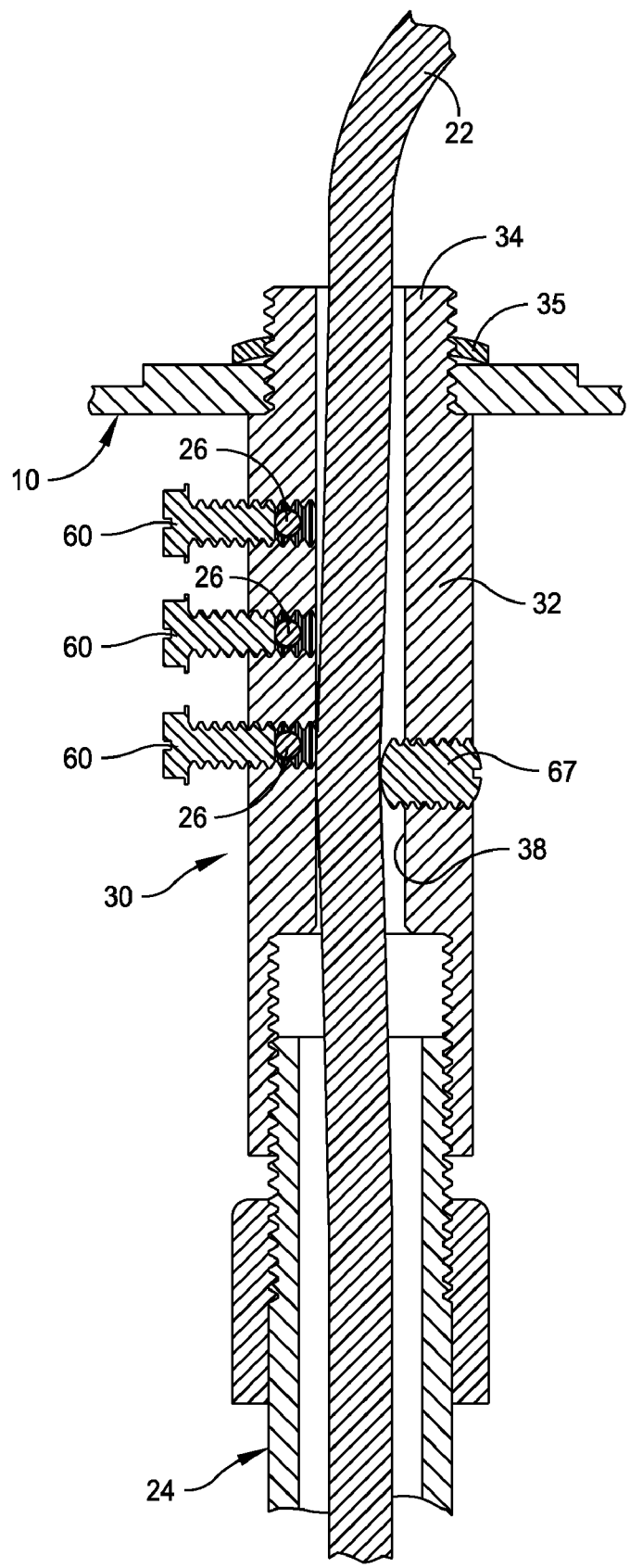
FIG. 13 is a cross-sectional view taken along line 13-13 of FIG. 12.

Reference is now made to FIGS. 1-8 as well as FIGS. 11-13 for further details of the inline bonding device 30. This device is comprised of mainly an electrically conductive housing 32 that is preferably cylindrical in shape and includes a threaded top male member 34 and a lower internally threaded female member 36. In this regard refer to the cross-sectional view of FIG. 4. A threaded securing ring is used for attaching the inline bonding device to the junction box such as shown in FIGS. 11 and 12. The electrically conductive housing may be constructed of any one of a number of different metal materials and includes a through passage 38. As shown in FIGS. 12 and 13, the main ground conductor 22 couples through the passage 38. In that way there is no interruption in the ground lead and it can couple directly to the typical ground rod.

Figure 1:
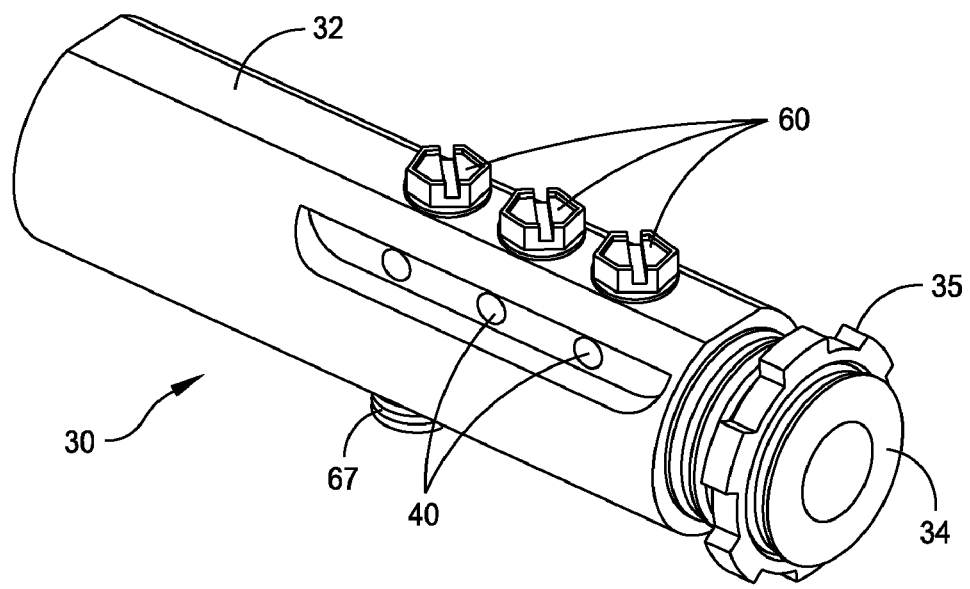
FIG. 1 is a perspective view of one embodiment of the inline bonding device constructed in accordance with the present invention.
Figure 2:
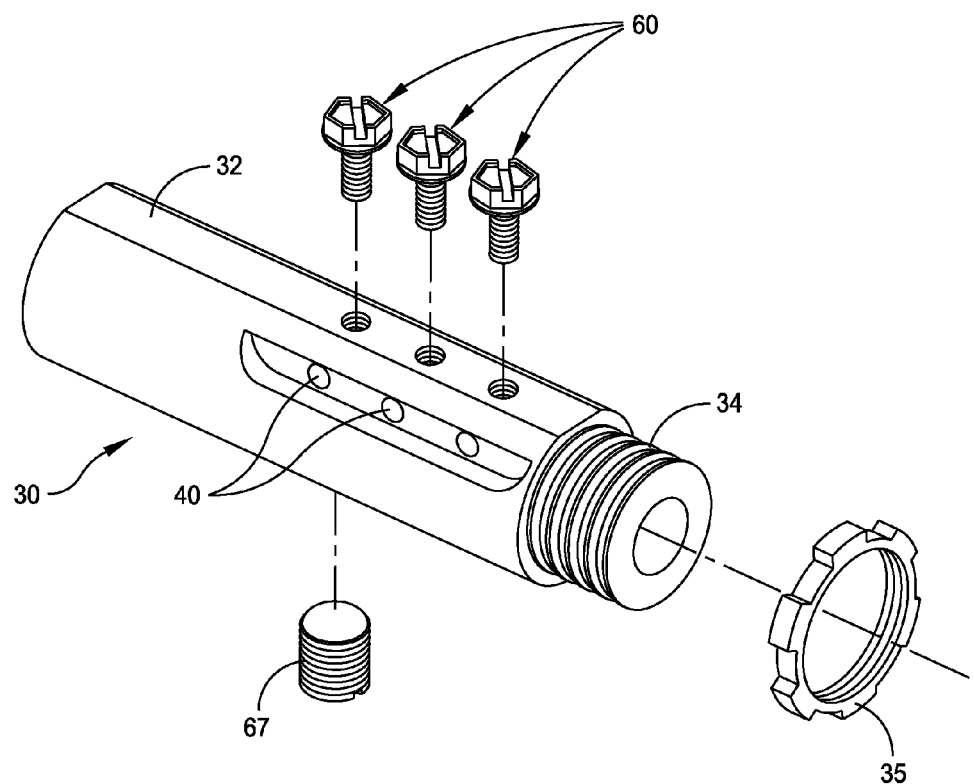
FIG. 2 is a perspective view like that shown in FIG. 1 but with components exploded away from the main housing.
Figure 3:
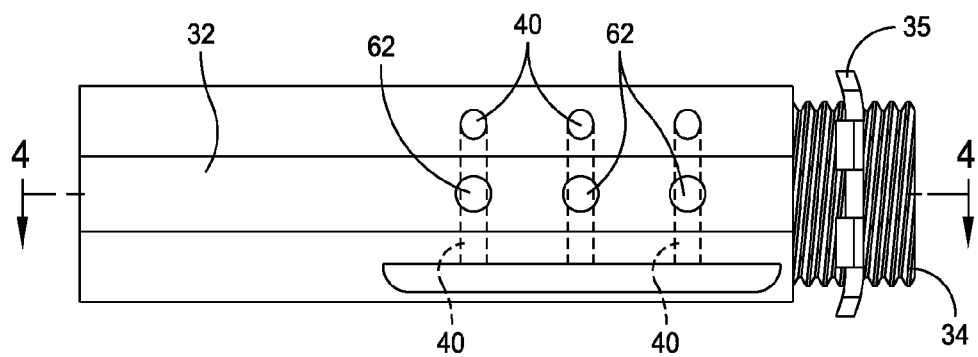
FIG. 3 is a side elevation view.
Figure 4:
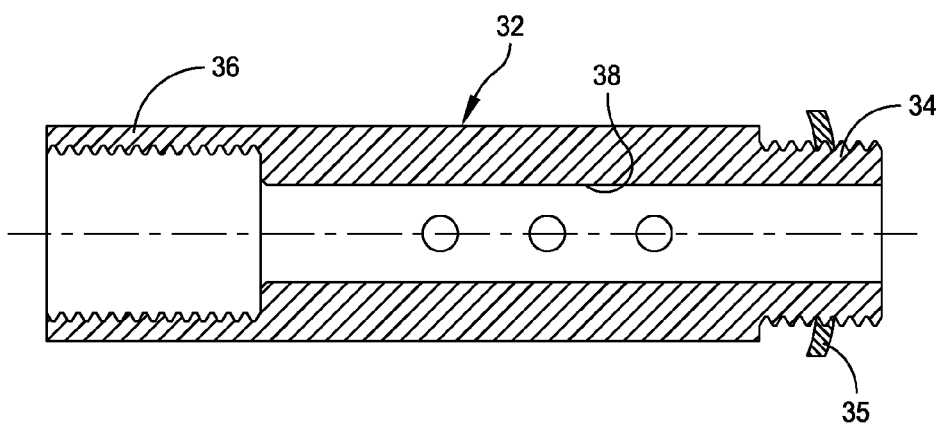
FIG. 4 is a cross-sectional view taken along line 4-4 of FIG. 3.

As indicated previously, the inline bonding device of the present invention provides an electrical ground to a plurality of remote devices 28 from the main junction box 10. This is enabled by including a plurality of passage holes in the housing 32 that extends substantially transverse to the elongated center passage 38. These plurality of passage holes are spaced from each other and are illustrated in the drawings at 40 (refer to FIG. 11). FIGS. 1 and 2 illustrate these passage holes 40 without any ground wires therein, while FIGS. 11 and 12 illustrate the passage holes 40 with wires extending therethrough. FIG. 11 illustrates one of the remote ground wires 26 with its insulation cut back so that the conductive part of the ground wire 26 can pass through the hole 40. Preferably, as illustrated in FIGS. 11 and 12, each of the ends at 43 of these ground wires extend into a channel 44 and extend a slight distance such as ⅛th inch into the channel. In that way, the installer can be assured that the ground wire 26 is engaged and secured and properly in place.

In order to lock the ground wires 26 in place, there are provided a plurality of fasteners 60. Each of these fasteners is used to retain the ground wire in each of the corresponding passage holes. In this regard refer to FIG. 11 and one of the fastening screws 60 that is shown exploded away from the housing 32. This illustrates the internally threaded hole 62 as well as the passage hole 40 for the trimmed end of the ground wire 26. Thus, the plurality of threaded holes extend transverse to the respective ground wire passage holes and receive each of the respective fasteners 60. The cross-sectional view of FIG. 13 illustrates the fasteners 60 having been tightened against the ground wire 26. In FIG. 13 it is noted that these threaded passages extend into the main passage 38. However, in an alternate embodiment these passages need not extend into the passage 38. Also, the passage holes 40 do not intersect with the main passage 38 but instead there is a thin wall provided therebetween such as at 41 in FIG. 5.

Figure 8:
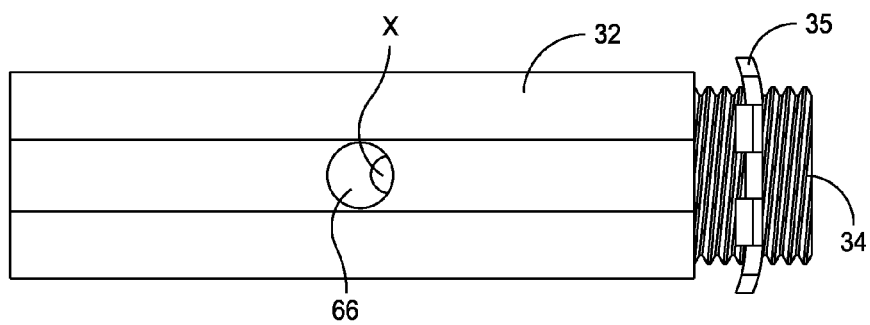
FIG. 8 is a side elevation view from the opposite direction.

In order to retain the inline bonding device in place, and particularly with regard to the ground wire 22, there is provided a further passage 66 as illustrated in FIGS. 5 and 8. The internally threaded passage 66 is for receiving a set screw 67. In this regard refer also to the cross-sectional view of FIG. 13 which illustrates the set screw 67 having been secured in place with its distal end urged against the ground cable 22.

The following are steps in the installation of the inline bonding device of the present invention. Step 1—the device can be installed with ½ inch pvc or emt tubing to protect service ground. Step 2—the pvc is cut to an appropriate length usually 36 inches or more depending upon the placement of the meter box. Step 3—insert 6 awg bare or 4 awg bare grounding wire into the pvc or emt and also add ½ inch pvc adapter and screw to the device. Step 4—bring the ground wire through the inline bonding device. Step 5—attach ground to ground attachment in the meter box at block 20. Step 6—slide the device and the pvc through the knockout in the junction box and attach with the lock nut 35. Step 7—tighten the main bonding screw 67 and strip and insert the wire to be bonded so at least ⅛ inch of wire is visible to ensure connection. Step 8—then tighten all bonding screws 60.

Figure 14:
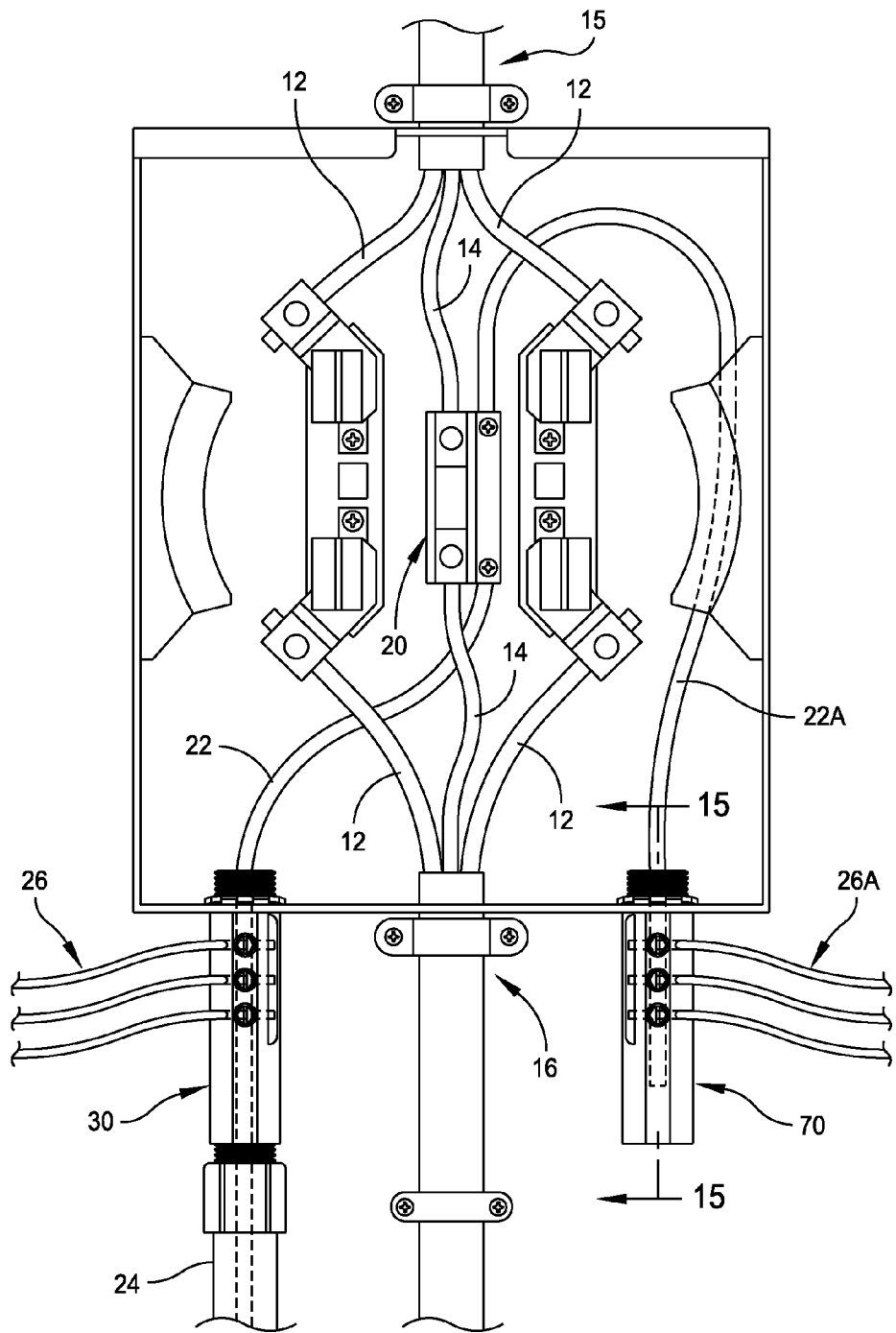
FIG. 14 is an illustration of a junction box in accordance with a second embodiment in which a second bonding device is used.
Figure 15:
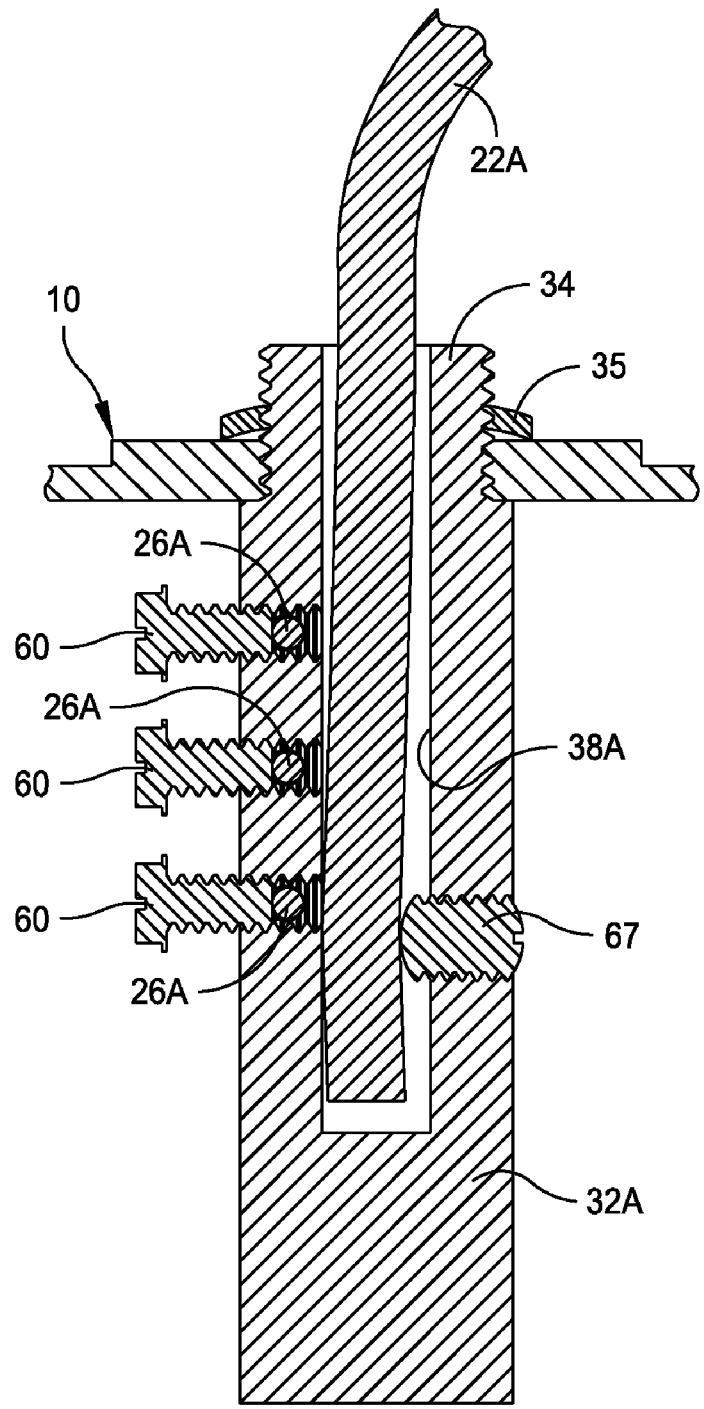
FIG. 15 is a cross-sectional view taken along line 15-15 of FIG. 14.

In accordance with the present invention, and as illustrated in FIGS. 14 and 15, an alternate or additional bonding device 70 may be provided for essentially bonding together an auxiliary ground cable 22A with the ground wires 26A. This device is not inline with the normal ground cable 22 but instead is an auxiliary device that may be used for attaching to additional remote devices from the respective ground wires 26A. As illustrated in the cross-sectional view of FIG. 15, the bonding device includes a housing 32A. Rather than having a through passage, the housing 32A has a blind hole so that the cable 22A simply terminates within the passage 38A. This bonding device also includes the set screw 67 as well as the fasteners 60. The housing 32A may be quite similar to the housing 32 previously described and including the aforementioned channel therein. Thus, the construction of the housing 32A may be substantially identical to that previously described with the exception that the main center passage does not continue through the entire housing as illustrated in FIG. 15.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A bonding device for providing an electrical ground to a plurality of remote devices from a main junction box with a main ground cable, said bonding device comprising:
   an electrically conductive housing having a through passage for receiving therethrough the main ground cable;
   said electrically conductive housing being of elongated shape with an elongated through passage;
   said electrically conductive housing further including a plurality of passage holes that each extend substantially transverse to the elongated through passage;
   each of said passage holes for receiving a ground wire associated with one of the remote devices;
   and fasteners for retaining the ground wire in each corresponding passage hole;
   wherein the passage holes are through holes;
   and a channel in a sidewall of the electrically conductive housing for receiving an end of each ground wire.

2. The bonding device of claim 1 wherein the electrically conductive housing is constructed of a metal material and the channel is an elongated channel that bridges across a plurality of ground wires.

3. The bonding device of claim 1 wherein the passage through the electrically conductive housing has a larger diameter than the diameter of each passage hole and the channel is an elongated channel that extends substantially in parallel to the housing through passage.

4. The bonding device of claim 3 wherein the passage holes are through holes including a set screw through the electrically conductive housing, disposed across from said fasteners and urged against the main ground cable to hold the main ground cable in place.

5. The bonding device of claim 1 wherein each ground wire extends a predetermined distance beyond the terminal end of each passage hole.

6. The bonding device of claim 1 wherein the electrically conductive housing also has a plurality of threaded holes that extend transverse to the respective ground wire passage holes and receive the respective fasteners.

7. The bonding device of claim 6 wherein each fastener is a threaded screw with the end thereof tightened against a corresponding ground wire.

8. The bonding device of claim 1 including a set screw through the electrically conductive housing urged against the main ground cable to hold the ground cable in place 9 wherein the passage holes are straight holes disposed in a sidewall of the housing and spaced from the housing through passage so as to be non-communicative therewith.

9. The bonding device of claim 8 wherein the electrically conductive housing includes a top threaded male end that is adapted for securing to a hole in the main junction box by means of a threaded ring, and a bottom threaded female end for receiving an insulator sheath.

10. A bonding device for providing an electrical ground to a plurality of remote devices from a main junction box with a main ground cable, said bonding device comprising:
   an electrically conductive housing having a through passage for receiving therethrough the main ground cable;
   said electrically conductive housing being of elongated shape with an elongated through passage;
   said electrically conductive housing further including a plurality of passage holes that each extend substantially transverse to the elongated through passage;
   each of said passage holes for receiving a ground wire associated with one of the remote devices;
   and fasteners for retaining the ground wire in each corresponding passage hole;
   wherein the passage through the electrically conductive housing has a larger diameter than the diameter of each passage hole;
   wherein the passage holes are through holes;
   wherein each ground wire extends a predetermined distance beyond the terminal end of each passage hole;
   and a channel in a sidewall of the electrically conductive housing for receiving an end of each ground wire.

11. A bonding device for providing an electrical ground to a plurality of remote devices from a main junction box with a main ground cable, said bonding device comprising:
   an electrically conductive housing having a through passage for receiving therethrough the main ground cable;
   said electrically conductive housing being of elongated shape with an elongated through passage;
   said electrically conductive housing further including a plurality of passage holes that each extend substantially transverse to the elongated through passage;
   each of said passage holes for receiving a ground wire associated with one of the remote devices;
   and fasteners for retaining the ground wire in each corresponding passage hole;
   wherein the electrically conductive housing also has a plurality of threaded holes that extend transverse to the respective ground wire passage holes and receive the respective fasteners;
   wherein each fastener is a threaded screw with the end thereof tightened against a corresponding ground wire;
   and wherein the threaded holes are in communication with the respective passage holes, and the passage holes are non-communicative with the main housing through passage.

12. A bonding device for providing an electrical ground to a plurality of remote devices from a main junction box, said bonding device comprising:
   an electrically conductive housing having a center passage for receiving therein a ground cable;
   said electrically conductive housing being of elongated shape;
   said electrically conductive housing further including a plurality of passage holes that each extend substantially transverse to the center passage;
   each of said passage holes for receiving a ground wire associated with one of the remote devices;
   and fasteners for retaining the ground wire in each corresponding passage hole;
   wherein the electrically conductive housing also has a plurality of threaded holes that extend transverse to the respective ground wire passage holes and receive the respective fasteners;
   wherein each fastener is a threaded screw with the end thereof tightened against a corresponding ground wire;
   and a set screw through the electrically conductive housing, disposed diametrically across from said fasteners and urged against the main ground cable to hold the main ground cable in place.

13. The bonding device of claim 12 wherein the electrically conductive housing is constructed of a metal material and a channel is disposed in a sidewall of the electrically conductive housing for receiving an end of each ground wire.

14. The bonding device of claim 13 wherein the channel is an elongated channel that extends substantially in parallel to the housing through passage.

15. The bonding device of claim 14 wherein the passage holes are through holes.

16. The bonding device of claim 15 wherein each ground wire extends a predetermined distance beyond the terminal end of each passage hole.

17. The bonding device of claim 12 wherein the center passage is a blind passage.

18. A bonding device for providing an electrical ground to a plurality of remote devices from a main junction box, said bonding device comprising:
   an electrically conductive housing having a center passage for receiving therein a ground cable;
   said electrically conductive housing being of elongated shape;
   said electrically conductive housing further including a plurality of passage holes that each extend substantially transverse to the center passage;
   each of said passage holes for receiving a ground wire associated with one of the remote devices;
   and fasteners for retaining the ground wire in each corresponding passage hole;
   wherein the passage in the electrically conductive housing has a larger diameter than the diameter of each passage hole;
   wherein the passage holes are through holes;
   wherein each ground wire extends a predetermined distance beyond the terminal end of each passage hole;
   and a channel in a sidewall of the electrically conductive housing for receiving an end of each ground wire.

19. The bonding device of claim 18 wherein the electrically conductive housing also has a plurality of threaded holes that extend transverse to the respective ground wire passage holes and receive the respective fasteners.

20. The bonding device of claim 19 wherein each fastener is a threaded screw with the end thereof tightened against a corresponding ground wire; wherein the threaded holes are in communication with the respective passage holes, and the passage holes are non-communicative with the main housing passage; and including a set screw through the electrically conductive housing urged against the main ground cable to hold the ground cable in place.

\* \* \* \* \*